United States Patent [19]

Miyazaki et al.

[11] Patent Number: 4,563,910
[45] Date of Patent: Jan. 14, 1986

[54] POSITIVE-LOCKING INDEXING SYSTEM FOR HIGH-SPEED OPERATION

[75] Inventors: Hiroo Miyazaki; Teruo Shirai, both of Ueda; Tsutomu Ogawa, Fuchu, all of Japan

[73] Assignee: Kabushiki Kaisha Miyano Tekkosho, Nagano, Japan

[21] Appl. No.: 584,596

[22] Filed: Feb. 29, 1984

[30] Foreign Application Priority Data

Mar. 16, 1983 [JP] Japan ................... 58-45114

[51] Int. Cl.⁴ ........................... B23Q 16/10
[52] U.S. Cl. ....................... 74/820; 74/822; 74/826
[58] Field of Search ............ 74/820, 822, 826, 827

[56] References Cited

U.S. PATENT DOCUMENTS 3,207,007 9/1965 Jennings ................... 74/820
3,593,597 7/1971 Jennings ................... 74/826
3,850,051 11/1974 Woltjen et al. ............ 74/827

Primary Examiner—Kenneth J. Dorner
Attorney, Agent, or Firm—Ladas & Parry

[57] ABSTRACT

A rotatable member to be indexed in a machine is intermittently rotated through specific angular displacements between predesignated indexing positions by an indexing mechanism driven by a hydraulic motor and is positively locked in each indexing position by a positive clutch coupling comprising a movable plate fixed to the rotatable member and a mating stationary plate fixed to a stationary part of the machine, the clutch coupling being engaged and disengaged by a hydraulic cylinder. The hydraulic motor and hydraulic cylinder are controllably and coordinately operated by a common hydraulic system including pipe and tank lines and at least one electromagnetic changeover valve of the two-position, four-connection type.

6 Claims, 6 Drawing Figures

POSITIVE-LOCKING INDEXING SYSTEM FOR HIGH-SPEED OPERATION

BACKGROUND OF THE INVENTION

This invention relates generally to indexing systems of machines such as lathes and other machine tools. More particularly, the invention relates to an indexing system having a relatively simple construction which is capable of holding a driven structure which has been indexed with a positive mechanical locking action against heavy loads so that its definitely determined indexed position will not shift unintentionally and, moreover, is capable of operating positively with the driven structure moving at high speed.

Indexing systems and devices are widely used in machining operations. Each indexing system and the machine in which it is installed require a certain indexing time for each indexing operation. The shorter this indexing time is, the longer will be the effective machining time be. For this reason, in order to elevate productive efficiency, there has been a great demand for high-speed indexing.

As one example, the indexing of the turret of a numerically controlled (NC) lathe will be considered. Heretofore, the most common indexing process has comprised, with the use of a clutch coupling, the sequential steps of (a) raising of the turret head to disengage a clamp of the coupling, (b) rotation of a turret indexing mechanism to carry out indexing of the turret head, and (c) retraction and clamping of the turret head simultaneously with completion of the indexing of the turret head.

A mechanism for carrying out this operation is that, for example, disclosed in Japanese Utility Model Laid Open Publication No. 57-202608 (202608/1982) and described more fully hereinafter. In this mechanism, briefly stated, a pin wheel driven by a motor carries out indexing of a turret via a geneva mechanism, while a cam also driven by the motor simultaneously accomplishes engagement or disengagement of a clutch coupling between the turret and the frame structure. This mechanism, however, has a disadvantageously complicated construction and high production cost due to the requirement of high dimensional precision in the fabrication of the cam for accurate, rapid, and cooperative movements in above described operational steps (a), (b), and (c).

Furthermore, when this mechanism is applied to an NC lathe for heavy turning work, it is necessary to withstand a heavy load to hold the engagement of the coupling. While a mechanical force afforded by a pin acts during the disengagement of the coupling at the time of indexing in this mechanism, the engagement force depends on the elastic force of a spring. For this reason, a spring of great spring force must be used. As a consequence, the cam and other parts of the engaging and disengaging mechanism of the coupling must unavoidably be made strong and large, whereby high-speed rapid operation cannot be attained, and moreover, a further increase in the cost arises.

SUMMARY OF THE INVENTION

In view of the above described difficulties encountered in the known art, it is an object of this invention to provide an indexing system of a machine in which system the engagement and disengagement of a positive clutch coupling are accomplished rapidly and positively by utilizing hydraulic force, the positively engaged state of the coupling being sustained with ample locking force for withstanding great loads arising from heavy operation of the machine, and which indexing system is of simple and compact construction and is suitably applicable to high-speed operations.

According to this invention, briefly summarized, there is provided an indexing system for indexing a rotary driven member to be indexed, which comprises: a main shaft fixed coaxially to the driven member and rotatably supported in a manner permitting some translation thereof in the axial direction thereof; an indexing mechanism driven by motive power means and intercoupled to the main shaft to rotate the same intermittently through specific angular increments between indexing positions; a clutch coupling comprising a movable plate fixed coaxially to the driven member and a stationary plate fixed to the frame structure in a position to coaxially and parallelly confront the movable plate, the movable and stationary plates being adapted to become mutually engaged in positively locked state and to become disengaged when the movable plate is pressed against and separated from the stationary plate; a hydraulic cylinder fixed relative to the frame structure and operating through a piston accommodated therein and connected to the main shaft to drive the same in said translation thereby to act through the driven member to move the movable plate against and away from the stationary plate; and an operating system for controllably operating the hydraulic cylinder and the indexing mechanism.

A feature of the indexing system of the above described construction is that the hydraulic cylinder makes possible rapid engagement and disengagement of the clutch coupling in timed relation with the operation of the indexing mechanism.

The motive power means for the indexing mechanism is desirably a hydraulic motor. The hydraulic motor and the hydraulic cylinder can both be connected to a single common hydraulic circuit system through one changeover valve of two-position, four-connection type, whereby the mutual time cooperation between the two driving components becomes even more positive, and the operation becomes even more accurate. Furthermore, the system can be simplified, and rapid followup action in high-speed operation can be obtained, whereby the indexing time can be shortened and the productivity increased.

The nature, utility, and further features of this invention will be more clearly apparent from the following detailed description with respect to preferred embodiments of the invention when read in conjunction with the accompanying drawings.

DETAILED DESCRIPTION OF THE INVENTION

Figure 6:
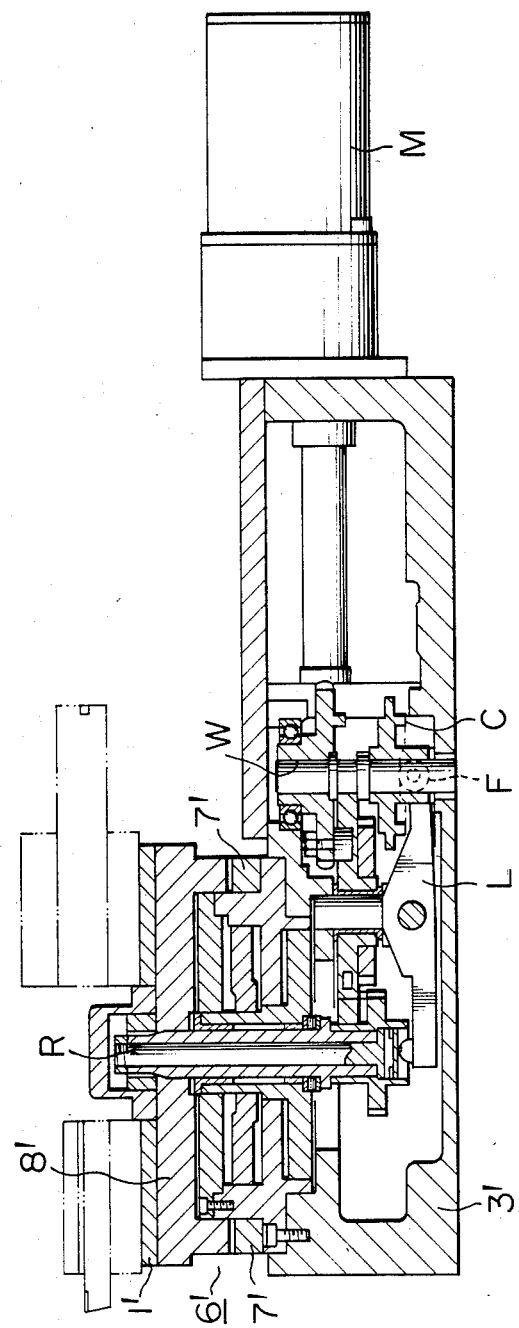
FIG. 6 is a sectional view of an example of a known indexing mechanism.

As conducive to a full understanding of this invention, the general nature and limitations of the conventional indexing mechanism will first be briefly described with reference to FIG. 6, which illustrates the device disclosed in the aforementioned Japanese Utility Model Laid Open Pub. No. 57-202608 (202608/1982). In this device, a motor M drives in rotation a pin wheel W and simultaneously a cam C. The pin wheel W carries out indexing of a turret 1' by way of a geneva mechanism, while the cam C carries out, by way of a cam follower F, a pivoted lever L, and an axially slidable pin P, engagement or disengagement of a clutch coupling 6' provided between the turret 1' and the frame structure 3' of the device.

As is apparent from this illustration, the construction of this conventional device is complicated. Furthermore, as mentioned hereinbefore, this device entails high cost due to the requirement of high dimensional precision in the fabrication of the cam C for accurate, rapid, and cooperative movements in the operation of the indexing device. Another problem is the necessity of using a strong and heavy spring for maintaining the coupling engaged when the indexed structure is being operated under a heavy load. This in turn necessitates a solid and bulky mechanism for engaging and disengaging the coupling which comprises the cam C, the cam follower F, the lever L, and the pin P, whereby high-speed operation cannot be attained, and the cost is further increased.

Figure 1:
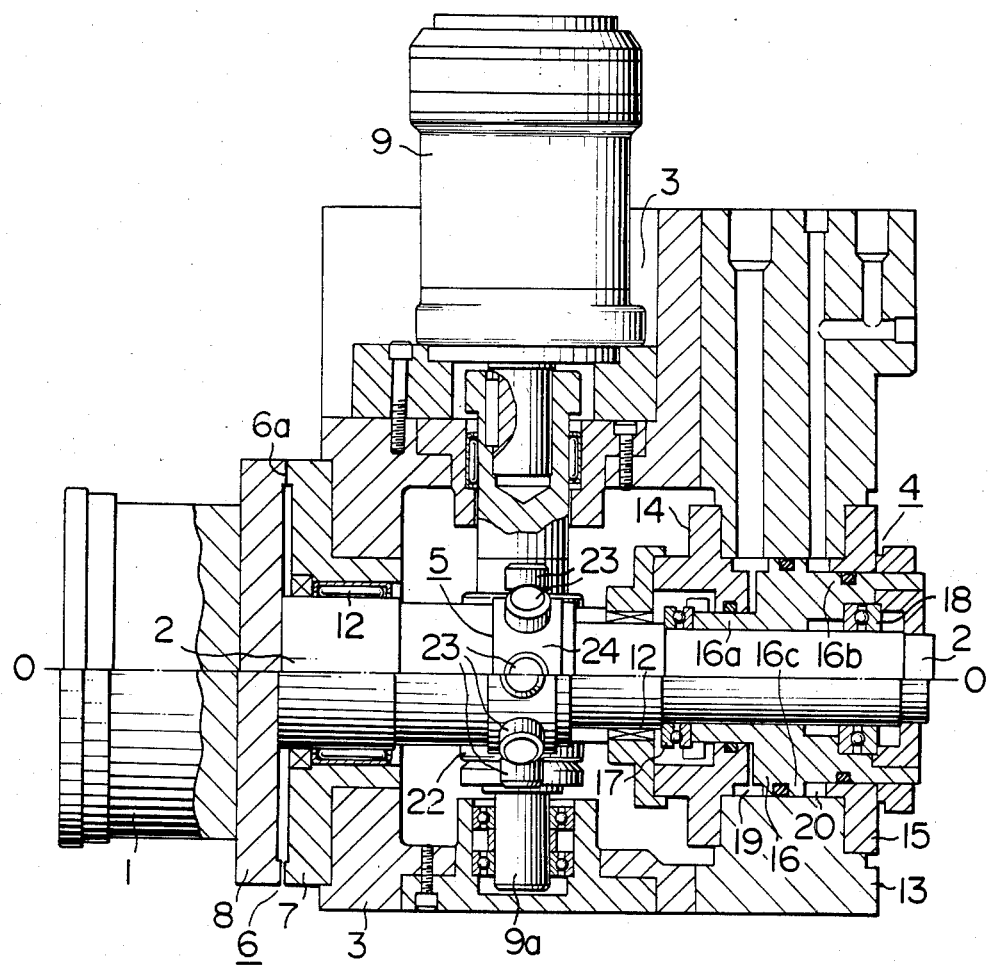
FIG. 1 is a plan view, partly in horizontal section, showing one embodiment of the invention.
Figure 2:
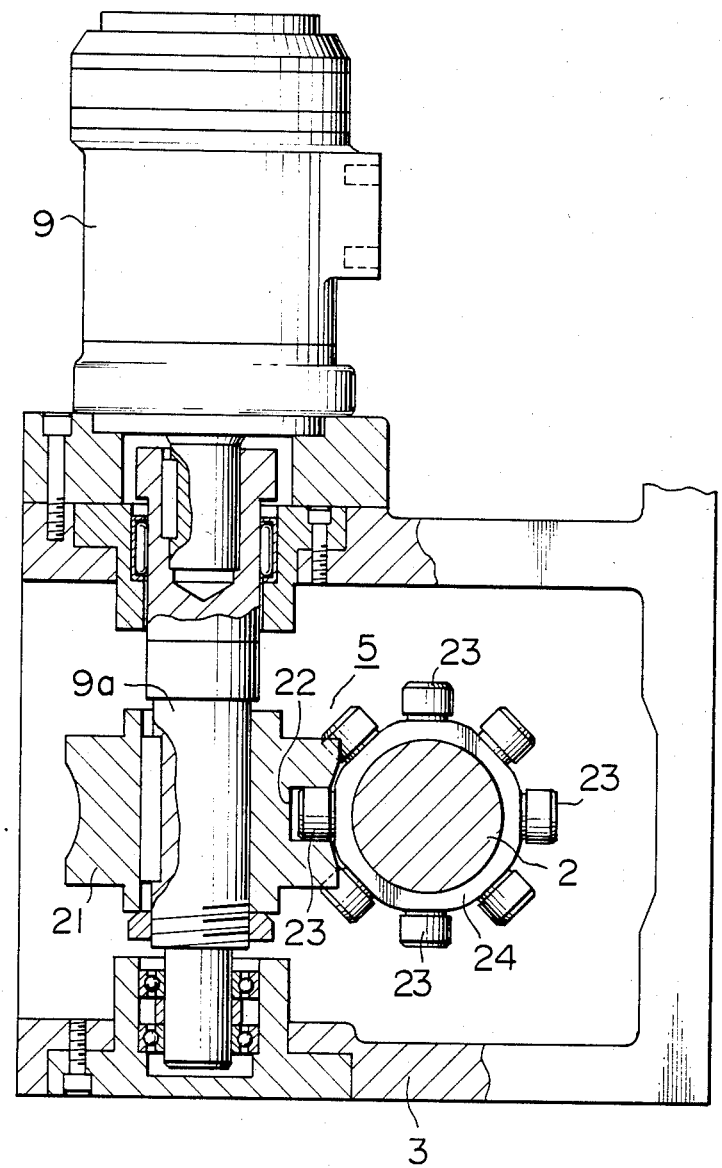
FIG 2 is a side view, partly in section, showing an indexing mechanism of the embodiment illustrated in FIG. 1.

These difficulties accompanying the above described conventional indexing device are overcome in this invention, which will now be described with respect to one embodiment thereof as shown in FIGS. 1 and 2. The illustrated indexing mechanism is adapted to index a driven structure 1 to be indexed, which in this example is an octagonal flat turret head in an NC lathe. This turret head 1 has an indexing pitch angle of 45 degrees, for example, around its axis of rotation.

This driven structure to be indexed (hereinafter referred to as turret) 1 is coaxially fixed at its rear or inward part to the front end of a main shaft 2, which is supported by needle bearings 12 on the lathe frame structure 3 in a manner permitting free rotation of the main shaft 2 and axial translation thereof through a specific small distance. The rear end part of the main shaft 2, or its end part remote from the turret 1, is passed coaxially through the piston 16 of a double-acting hydraulic cylinder 4 described more fully hereinafter. An indexing mechanism 5 is coaxially mounted on a middle part of the main shaft 2.

A movable coupler plate 8 of a clutch coupling 6 comprising the movable coupler plate 8 and a stationary coupler plate 7 is coaxially fixed to the rear or inner face of the turret 1 and coaxially confronts the stationary plate 7. The stationary plate 7 is fixed to the lathe frame structure 3. Both of the movable and stationary plates 8 and 7 have, on their mutually confronting faces, a large number of clutch teeth 6a extending radially and spaced at equal angular intervals. The positional relationship in the axial direction between the movable and stationary plates 8 and 7 of the clutch coupling 6 is such that the clutch teeth respectively of the two plates 8 and 7 can mutually engage or disengage depending on the axial position of the main shaft 2 relative to the lathe frame structure 3.

The aforementioned double-acting hydraulic cylinder 4 comprises a cylinder main structure 13, front and rear end caps 14 and 15 respectively secured to the front and rear ends of the structure 13 to form an integral cylinder therewith, and the piston 16 slidably fitted in the cylinder main structure 13 and coaxially fitted on the main shaft 2 and held in the following manner. The piston 16 is clamped by and between front and rear ball bearings 17 and 18 fixed to the main shaft 2, whereby the piston 16 and the main shaft 2 can rotate relative to each other about their axis but cannot move relatively in their axial direction.

The piston does not have a constant outer diameter but has a front end part 16a of small outer diameter in tight slidable fit with an inner wall surface of the front end cap 14, a rear end part 16b of greater outer diameter in tight slidable fit with an inner wall surface of the rear end cap 15, and a middle part 16c of even greater outer diameter in tight slidable fit with the inner wall surface of the cylinder main structure 13. A front actuation chamber 19 is thus formed between the rear face of the front end cap 14, the front face of the above mentioned middle part 16c of the piston 16, and the inner wall surface of the cylinder main structure 13. A rear actuation chamber 20 is also formed between the front face of the rear end cap 15, the middle part 16c of the piston 16, and the inner wall surface of the cylinder main structure 13. Thus, the area of the piston part in the front actuation chamber 19 subject to axial rearward pressure force is greater than the area of the piston part in the rear actuation chamber 20 subject to axial forward pressure force.

Accordingly, when the piston 16 is to be shifted forward (leftward as viewed in FIG. 1) to cause the turret 1 at the front end of the main shaft 2 to advance slightly forward thereby to disengage the clutch coupling 6, hydraulic fluid under pressure is supplied into the rear actuation chamber 20. Conversely, when the piston 16 is to be moved rearward to engage the clutch coupling, the pressurized hydraulic fluid is supplied into the front actuation chamber 19, in which the area of the piston 16 for receiving rearward pressure force is great. Therefore, when the hydraulic fluid is supplied under constant pressure, it becomes possible to impart a great actuation force in the direction for engaging the clutch coupling.

For the aforementioned indexing mechanism 5, in general, an intermittent feeding mechanism capable of causing a shaft to rotate intermittently a specific angle of rotation (45 degrees in this example) at a time is utilized. Examples of such mechanisms heretofore used are ratchet wheel mechanisms, geneva mechanisms, and other intermittent teeth gear mecha- nisms.

An intermittent feeding mechanism of high feeding precision which can be stopped without backlash and is applicable to high-speed operation is desirable. Accordingly, a roller-gear and cam type indexing mechanism from among cam-type indexing mechanisms is used in the instant example.

This mechanism 5 comprises a waisted drum cam 21 (FIG. 2) having a groove 22 around its outer peripheral part and fixedly mounted on a shaft 9a driven by a hydraulic motor 9, a revolving hub 24 fixedly and coaxially mounted on the main shaft 2 at a midportion thereof, and eight rollers 23, 23, . . . rotatably supported on respective shafts which are imbeddedly fixed at their root parts to the outer peripheral part of the revolving hub 24 at equal angular intervals of 45 degrees, whereby the axes of the rollers 23, 23, . . . extend radially out from hub 24, the rollers 23, 23, . . . successively engaging with the groove 22 during the operation of the mechanism 5. The axis of the shaft 9a is perpendicular to, but offset from, the axis of the main shaft 2.

The groove 22 in the cam 21 has, within one circumferential span, a first groove portion extending in the circumferential direction and a second groove portion extending obliquely relative to the circumferential direction and contiguously adjoining the first groove portion. The second groove portion exerts a cam action on a roller 23 to rotate the revolving hub 24 and the main shaft 2 through 45 degrees of angle, while the first groove portion carries out positioning of the revolving hub 24 and therefore the shaft 2 and the turret 1 after the 45-degree rotation.

Accordingly, for each revolution of the shaft 9a driven by the motor 9, the main shaft 2 is driven in intermittent rotation of 45 degrees. By using a hydraulic motor 9 of reversible type, it becomes possible to rotate the main shaft 2 intermittently by increments of 45 degrees in either direction. By elevating the dimensional precision of the fit between the outer diameter of the rollers 23 and the width of the groove 22 and, at the same time, imparting a preload on the revolving hub 24 side, backlash can be eliminated and the indexing precision can be elevated.

Figure 3:
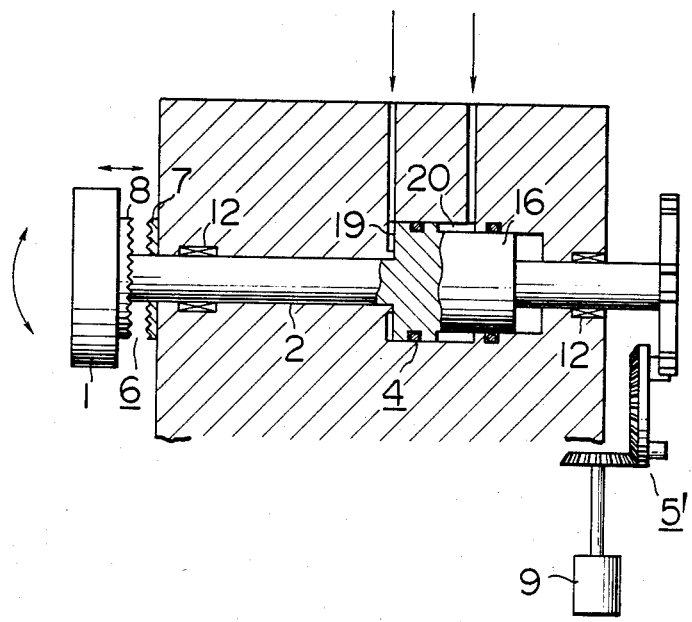
FIG. 3 is a schematic plan view showing another embodiment of the invention.
Figure 4:
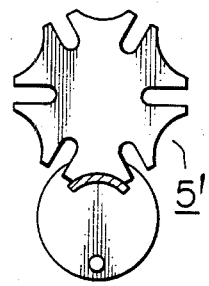
FIG. 4 is a simplified side view of the indexing mechanism of the embodiment shown in FIG. 3.

The indexing mechanism of roller-gear and cam type of the construction described above has the advantage of being amply applicable even to high-speed operation. For this reason, it is highly suitable for systems for accurate and positive indexing at high speeds. The indexing mechanism 5 according to this invention is not limited to one of a roller-gear and cam type but may be a geneva mechanism 5' as indicated in FIGS. 3 and 4. In FIGS. 3 and 4, those parts which are the same or equivalent to corresponding parts in FIGS. 1 and 2 are designated by the same reference numerals, and since the construction is similar except for the geneva mechanism 5', further description thereof is deemed unnecessary.

Figure 5:
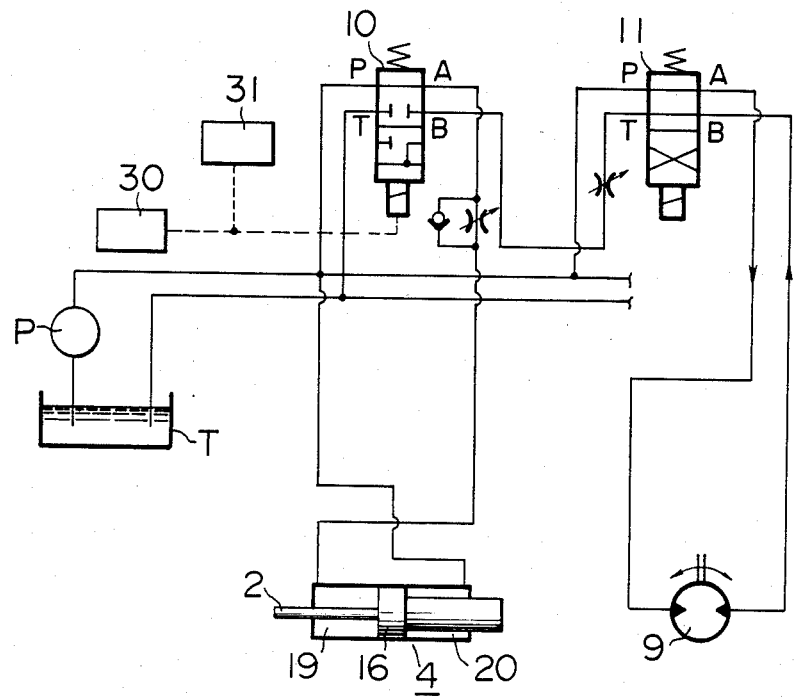
FIG. 5 is a hydraulic circuit diagram showing one example of a hydraulic control system for the indexing system according to the invention.

The mechanical component of the indexing system according to this invention of the above described construction is controllably operated in the following manner by a hydraulic activating system as shown in FIG. 5.

In the hydraulic system shown in FIG. 5, the hydraulic motor 9 is the motor for driving the indexing mechanism 5, and the hydraulic cylinder 4 functions as an actuator for engaging and disengaging the clutch coupling 6. Since both the hydraulic motor 9 and the hydraulic cylinder 4 are hydraulic devices, they can be operated by using a single common hydraulic system circuit.

For the hydraulic motor 9, a reversible-flow hydraulic motor of fixed-displacement type is used. The hydraulic cylinder 4 is of the type in which the front and rear pressure receiving areas of the piston differ as described hereinbefore. These two hydraulic devices 9 and 4, an electromagnetic changeover valve 10 of two-position, four-connection type, an electro-magnetic changeover valve 11 of two-position, four-connection type, a hydraulic liquid reservoir or tank T, a pump P, a check valve, flow control valves, and piping and/or hydraulic passages connected as indicated in FIG. 5 constitute the hydraulic system.

The hydraulic motor 9 has two ports respectively connected to first the second actuator ports A and B of the changeover valve 11. The port of the hydraulic cylinder 4 communicating with its front actuation chamber 19 is connected to a first actuator port A of the valve 10, while its port communicating with its rear actuation chamber 20 is connected directly to the pump line.

The changeover valves 10 and 11 are spring offset valves. When the valve 10 is inoperative, that is, when its solenoid is deenergized, its second actuator port B and tank port T are closed, and its first actuator port A and pump port P are in communicative state. When this valve 10 is operative, that is, when its solenoid is energized, its pump port P is closed, and its tank port T and first and second actuator ports A and B are in communicative state.

When the changeover valve 11 is inoperative, that is, when its solenoid is deenergized, its actuator ports A and B are communicative respectively with its pump port P and with its tank port T. When this changeover valve 11 is operative, that is, when its solenoid is energized, its first and second actuator ports A and B are communicative respectively with the tank port T and with the pump port P. Thus, this changeover valve 11 changes over the directions of hydraulic fluid flow.

Then, by connecting the two pump ports P, P of the valves 11 and 10 to the pump line, at the same time connecting the tank port T of the changeover valve 11 to the second actuator port B of the valve 10, and further connecting the tank port T of the valve 10 to the tank line, the hydraulic circuit is formed.

When the changeover valve 10 is inoperative, one of the two ports of the hydraulic motor 9 is blocked at the second actuator port B of the valve 10, so that the hydraulic motor 9 remains in its stopped state with the hydraulic pressure applied thereto, irrespective of the operative or inoperative state of the changeover valve 11.

On the other hand, since the pump line becomes communicative simultaneously with the front and rear actuation chambers 19 and 20 of the hydraulic cylinder 4, the piston 16 is moved by the difference in pressure receiving areas thereof in the direction for decreasing the volume of the rear actuation chamber 20, that is, in the direction which causes the main shaft 2 to retract rearward. As a consequence, the movable coupler plate 8 of the clutch coupling is forced into meshing engagement with the stationary coupler plate 7, whereby the clutch coupling 6 becomes engaged.

When the valve 10 is operative, the front actuation chamber 19 of the hydraulic cylinder 4 is communicative by way of the first actuator port A of the valve 10 with the tank line, and the rear actuation chamber 20 of the hydraulic cylinder 4 is communicative with the pump line. Accordingly, the piston 16 is caused by the differential pressure to move in the direction to reduce the volume of the front actuation chamber 19, that is, in the direction to cause the main shaft 2 to advance forward. As a result, the clutch coupling 6 is disengaged.

On the other hand, one of the ports of the hydraulic motor 9 becomes communicative by way of the changeover valve 11 with the pump line, while the other port of the hydraulic motor 9 becomes communicative via the changeover valve 11 and the second actuator port B of the valve 10 with the tank line. Accordingly, the hydraulic motor 9 rotates in the direction determined by the state of operation of the changeover valve 11, thereby causing the indexing mechanism 5 to undergo indexing operation with 45 degrees of angle as one pitch.

The principal features of the indexing operation of the indexing system comprising the mechanical parts and hydraulic system described above will now be described with reference to the drawings.

During a machining operation such as turning by the turret 1, the changeover valves 10 and 11 are in their respective inoperative states as shown in FIG. 5, and the main shaft 2 is in the position indicated above its centerline O—O in FIG. 1. As a consequence, the clutch coupling 6 is in its engaged state, and the turret 1 is mechanically fixed to the lathe frame structure 3.

By setting the acting force of the hydraulic cylinder 4 at this time at an amply great value, the turret 1 can be positively held in locked state against the load due to heavy machining.

When one machining step of the turret 1 has been completed, and indexing becomes necessary, a signal for starting the indexing operation is appropriately generated at an indexing control device 30 (FIG. 5) and transmitted to the solenoid of the valve 10. In response to this signal, the solenoid of the changeover valve 10 is energized to change over the valve, and the hydraulic cylinder 4 and the hydraulic motor 9 are driven simultaneously. The main shaft 2 is thereby placed in the state indicated below its centerline O—O in FIG. 1, and the clutch coupling 6 is disengaged. The turret 1 is thus released from its locked state, and at the same time the hydraulic motor 9 rotates, whereby the indexing mechanism 5 carries out its indexing operation.

As a result, the turret 1 is caused to undergo an indexing rotation of 45 degrees. This rotation is detected by a position detector 31 (FIG. 5) which accordingly generates a signal for stopping the indexing operation. In response to this signal, the solenoid of the changeover valve 10 is deenergized, whereby the clutch coupling 6 becomes engaged, and the turret 1 is again mechanically fixed to the lathe frame structure 3, while the hydraulic motor 9 stops because the second actuator port B of the valve 10 is closed. Thus, one cyclic step of indexing is completed.

In this connection, a certain time is required from the generation of the above mentioned stopping signal for the restoration of the changeover valve 10 and the complete stopping of the operations of the hydraulic cylinder 4 and the hydraulic motor 9. This time may be thought to appear as an error in the indexing angle, but such errors can be prevented by appropriately selecting the length of that part of the groove 22 in the cam 21 of the indexing mechanism 5 which extends in the circumferential direction about the cam axis, that is, the length of the idling part of the groove 22 which does not impart rotation to the main shaft 2, and the indexing system is amply capable of high-speed operation.

The indexing can be carried out in one direction, for example, in the clockwise direction, as the designated direction when the changeover valve 11 is in its inoperative state, but, in some angular positions of the turret, the succeeding work can be moved to the working place more rapidly by indexing in the counterclockwise direction rather than the clockwise direction. In this case, it is preferable to cause the changeover valve 11 to undergo changing over operation to shorten the time required for indexing. However, in the case where there is no necessity of changing the indexing rotational direction in this manner, and indexing is carried out in a single direction, the changeover valve 11 is omitted.

While, in the above described example the indexing angle is 45 degrees, it will be obvious, of course, that the indexing system of this invention can be applied to an indexing angle of any other value.

The principal features of advantage and utility of this invention are as follows.

When the indexed driven member 1 is in an indexed position, the great acting force of the hydraulic cylinder 4 is being applied by way of the clutch coupling 6 to the indexed member 1. For this reason, locking with a powerful force overcoming any reactive force from the indexed member 1 becomes possible. Accordingly, positive locking of the indexed member 1 in the indexing position is attained, heavy loads due to causes such as heavy machining being amply withstood, whereby improvement of machining precision is afforded.

Furthermore, the above described positive locking is achieved by merely adding to a clutch coupling 6 a hydraulic cylinder 4, which, moreover, is merely connected coaxially to a main shaft 2, whereby the construction is simple and relatively inexpensive.

Still another feature is that the hydraulic motor 9 driving the indexing mechanism 5, such as one of the roller-gear and cam type, and the above mentioned hydraulic cylinder 4 are operable by a common hydraulic system, whereby the advantage of simplification of the control system is afforded. Moreover, with the ON-OFF actuation of a single electromagnetic changeover valve 10, the engaging and disengaging action of the clutch coupling 6 and the intermittent rotating and stopping of the indexing mechanism 5 can be brought about in a cooperative manner. Accordingly, the high precision of the machining can be maintained while indexing and locking are accomplished rapidly and positively, whereby the machine idle time can be substantially shortened and the production efficiency can be improved.

While this invention has been described above with respect to an embodiment thereof applied to an NC lathe, it will be evident that the invention is not so limited in its scope but can be applied with equal effectiveness to a broad range of other machines and apparatuses requiring rapid, positive, and precise indexing.

What is claimed is:

1. An indexing system for indexing a driven member to be indexed, with respect to rotation thereof about an axis thereof in a machine having a frame structure, said index system comprising:
 a main shaft fixed coaxially to the driven member and rotatably supported in a manner permitting some translation thereof in the axial direction thereof;
 an indexing mechanism driven by a hydraulic motor and intercoupled to the main shaft to rotate the same intermittently through specific angular increments between indexing position;
 a clutch coupling comprising a movable plate fixed coaxially to the driven member and a stationary plate fixed to the frame structure in a position to coaxially and parallelly confront the movable plate, the movable and stationary plates being adapted to become mutually engaged in positively licked state and to become disengaged when the movable plate is pressed against and separated from the stationary plate;
 a hydraulic cylinder fixed relative to the frame structure and operating through a piston accomodated therein and connected to the main shaft to drive the same in said translation thereby to act through the driven member to move the movable plate against and away from the stationary plate; and an operating system for controllably operating the hydraulic cylinder and the indexing mechanism, said operating system being a hydraulic system having a pump line, a tank line, and a changeover valve of two-position, four-connection type provided with a pump port connected to the pump line, a tank port connected to the tank line, a first actuator port, and a second actuator port, the area of the surface of the piston to receive pressure for actuating the clutch coupling in the engaging direction being greater than that of the opposite surface of the piston, the actuation chamber of the hydraulic cylinder on the side of the smaller piston surface area being connected to the pump line, the opposite actuation chamber on the side of the greater piston surface area being connected, when the changeover valve is in its one changeover position, to the pump port via the first actuator port and being connected, when the changeover valve is in its other changeover position, to the tank port via the first actuator port, the hydraulic motor being connected to the pump line and to the second actuator port, which is closed when the valve is in said one changeover position and is communicated with the tank line when the valve is in said other changeover position.

2. An indexing system as claimed in claim 1 in which the changeover valve is associated with means which moves the valve to its one changeover position during the period from the time the driven member comes to rest at a specific position upon completion of an indexing movement to the instant immediately prior to the start of its succeeding indexing movement.

3. An indexing system as claimed in claim 1 in which the indexing mechanism comprises: a drum cam having a cam groove around the outer peripheral part thereof and coaxially fixed to a rotary shaft connected to the motive power means for intermittent rotation; a revolving hub coaxially fixed to the main shaft; and a plurality of rollers which are supported on the outer peripheral part of the hub to be rotatable about respective axes extending radially and spaced at equal angular intervals around the hub, the rollers being successively engageable by the cam groove of the drum cam and thereby being driven intermittently to revolve through a specific arcuate displacement, whereby the main shaft and therefore the driven member are caused to undergo indexing rotation of specific angular increments between indexing positions.

4. An indexing system as claimed in claim 1 in which the indexing mechanism comprises a geneva mechanism driven by the motive power means and driving the main shaft in said specific angular increments between indexing positions.

5. An indexing system as claimed in claim 1 in which the hydraulic motor is of reversible type.

6. An indexing system as claimed in claim 1 in which the hydraulic motor is of reversible type and in which the hydraulic system further comprises a second changeover valve of two-position, four-connection type provided with a pump port connected to the pump line, a tank port connected to the second actuator port of the first changeover valve, a first actuator port connected to the one port of the hydraulic motor, and a second actuator port connected to the other port of the hydraulic motor, the first and second actuator ports being communicatively connected to the pump port and the tank port, respectively, when the second changeover valve is in one changeover position and to the tank port and the pump port, respectively, when the second changeover valve is in the other changeover position.

* * * * *